United States Patent
Coffin et al.

(10) Patent No.: US 8,534,227 B2
(45) Date of Patent: Sep. 17, 2013

(54) AQUACULTURE NET WITH HIGH-TENSILE STEEL WIRES

(75) Inventors: Charles Coffin, Jiangyin (CN); Xavier Amils, Kortrijk (BE)

(73) Assignee: NV Bekaert SA, Zwevegem (BE)

( * ) Notice: Subject to any disclaimer, the term of this patent is extended or adjusted under 35 U.S.C. 154(b) by 186 days.

(21) Appl. No.: 12/863,107

(22) PCT Filed: Dec. 11, 2008

(86) PCT No.: PCT/EP2008/067324
§ 371 (c)(1),
(2), (4) Date: Jul. 15, 2010

(87) PCT Pub. No.: WO2009/089970
PCT Pub. Date: Jul. 23, 2009

(65) Prior Publication Data
US 2011/0114028 A1    May 19, 2011

(30) Foreign Application Priority Data

Jan. 18, 2008 (EP) ................................ 08150400

(51) Int. Cl.
*A01K 63/02*    (2006.01)
(52) U.S. Cl.
USPC ............................................ 119/201
(58) Field of Classification Search
USPC .................. 43/7, 14; 245/4, 5; 119/201
See application file for complete search history.

(56) References Cited

U.S. PATENT DOCUMENTS

| 2,148,380 | A | * | 2/1939 | Schueler | ................... | 256/45 |
| 2,383,095 | A | * | 8/1945 | Wallace | ................... | 114/241 |
| 4,209,153 | A | * | 6/1980 | Vanvlaenderen | ............ | 245/8 |
| 5,967,086 | A | | 10/1999 | Knott, Sr. | | |
| 2007/0210214 | A1 | * | 9/2007 | Wartmann | ............ | 245/5 |
| 2008/0202441 | A1 | * | 8/2008 | Kunz Astete et al. | ...... | 119/201 |
| 2009/0229531 | A1 | * | 9/2009 | Stillman | ................ | 119/215 |
| 2010/0050952 | A1 | * | 3/2010 | Stillman et al. | ......... | 119/223 |
| 2010/0294201 | A1 | * | 11/2010 | Amils et al. | ............ | 119/201 |
| 2011/0265729 | A1 | * | 11/2011 | Atz et al. | ................. | 119/226 |

FOREIGN PATENT DOCUMENTS

| EP | 0 218 167 B1 | 4/1987 |
| JP | 01-321982 A | 12/1989 |
| JP | 2004-261023 A | 9/2004 |
| JP | 2005-211030 A | 8/2005 |

OTHER PUBLICATIONS

Maraging steel, Wikipedia, Oct. 3, 2008, http://en.wikipedia.org/w/index.php?title=Maraging_steel&oldid=242675083, retrieved from internet: Dec. 15, 2012.*

* cited by examiner

*Primary Examiner* — Kristen C Hayes
(74) *Attorney, Agent, or Firm* — Foley & Lardner LLP

(57) ABSTRACT

An aquaculture net comprises steel wires. At least the upper part of the net comprises steel wires having a tensile strength greater than 1500 MPa. This leads to an aquaculture net with an increased life time.

16 Claims, 2 Drawing Sheets

AQUACULTURE NET WITH HIGH-TENSILE STEEL WIRES

TECHNICAL FIELD

The invention relates to an aquaculture net with steel wires.

BACKGROUND ART

Aquaculture nets or fish-farming nets are used to raise aquatic life such as fish. The aquaculture net keeps the aquatic life controlled and contained and protects the aquatic life inside the net against predators such as sharks and sea wolfs.

The dimensions of such an aquaculture net are considerable. An example of a typical dimension is 30 m×30 m×15 m, the last dimension being the depth of the net inside the water and the first two dimensions being the width and length of the net at the water surface. The net may be formed of a polymer or of a galvanized steel wire. As a matter of example only, a net made of galvanized steel wire and of the above-mentioned dimensions has a weight above 4 metric Tonnes.

The aquaculture nets are usually of the chain-link fence type. This is a fence of steel wires woven into a diamond pattern. The meshes have a dimension that is smaller than the dimension of the fish. Each steel wire is preformed by bending so that it exhibits a wavy pattern with maxima and minima. The maxima or the peak of the wave has the highest amplitude value while the minima or the trough of the wave has the lowest amplitude value. The maxima of a steel wire interlock with the minima of a neighbouring wire to form the patterns of a series of diamonds.

Aquaculture nets of the chain-link fence type have proven to be successful to control the aquatic life and to protect against predators. Aquaculture nets with galvanized steel wires offer an acceptable resistance against bio-fouling, i.e. against fouling material that may grow on the mesh structure. Within the context of the present invention, the terms fouling material refer to fouling organisms such as barnacles, algae or mollusks, which may attach themselves to the wire material of the mesh structure and grow. This fouling mechanism is so persistent that entire openings in the meshes may be filled blocking any introduction of fresh water or nutrition into the volume inside the mesh structure.

Experience has shown, however, that aquaculture nets of the chain-link fence type also have some disadvantages. Aquaculture nets have been discovered where one or more of the steel wires was broken after a limited life time.

DISCLOSURE OF INVENTION

It is an object of the invention to avoid the disadvantages of the prior art.

It is also an object of the invention to provide an aquaculture net with a prolonged life time.

Investigation of the failing aquaculture nets revealed that particularly the upper steel wires in the aquaculture net were broken. Indeed, the ocean or the sea forms a huge challenge with respect to corrosion-resistance. In addition to this highly corroding environment, the waves and tidings subject the aquaculture net to a continuous and repeated movement. In an aquaculture net of the chain-link fence type, each steel wire must carry the weight of the rest of the net below it. The upper wire makes point contacts with the wire just below it. These point contacts are located at a point where both the upper wire and the wire just below it are subjected to both a bending and a torsion deformation. The continuous and repeated imposed movements in this aggressive environment create fretting at the point contacts.

Chain-link fence made of plain low carbon steel with a typical carbon content of 0.15 per cent by weight or lower have a high weight and low strength.

Aspects of the present invention are to lower the weight of chain link fences in general and aquaculture nets in particular, and to increase the tensile strength and/or breaking load of the net.

The aquaculture net according to the invention has at least in its upper part steel wires with a higher tensile strength. This higher tensile strength can be obtained by using steel wires with a higher carbon content or by subjecting the steel wires to a higher drawing reduction or by both. The higher tensile strength of one or more steel wires may result in steel wires with a higher breaking load and/or in steel wires with a lower weight. The resulting aquaculture net can be stronger due to the use of steel wires with a high breaking load or can be lighter due do the use of steel wires with a smaller diameter.

An example of an aquaculture net according to the invention compared to a conventional net with a normal carbon composition, tensile strength and weight is the following. A conventional net has a 0.05% by weight of carbon, a tensile strength of about 600 MPa and a weight of the net varying with the type of caging used. For a typical cage system of 30 meters diameter and 20 meters depth, this "normal" weight is in the range of 5 Tonnes. A net according to the invention comprises a carbon content typically ranging from 0.6% to 0.9% by weight, and a tensile strength ranging between 1600 MPa and 2500 MPa, resulting in a possible total weight reduction for the same cage system of minimum 50%.

According to a first aspect of the present invention, there is provided an aquaculture net comprising at least in its upper part one or more steel wires having a tensile strength greater than 1500 MPa, preferably greater than 1900 MPa, more preferably greater than 2500 MPa, e.g. greater than 3000 MPa.

An advantage of the invention is that the steel wires of the net may have a smaller diameter for a same breaking load as a conventional net wire. As such the aquaculture net has a smaller weight, and the steel wires can still easily be manipulated and woven into a net. Moreover, nets with smaller diameter wires have an increased resistance against fatigue.

Alternatively, the weight of the aquaculture net may be kept the same without reducing the individual wire diameters. The higher tensile strength, however, will lead to a higher breaking load and to a reduced number of fractures in the steel wires, thus leading to a prolonged life time.

In a specific embodiment the aquaculture net is a chain-link fence.

According to a second aspect of the present invention is provided an aquaculture net comprising at least in its upper part one or more steel wires having a carbon content greater than 0.40 weight per cent, e.g. 0.50 weight per cent, 0.80 weight per cent, 0.92 weight per cent.

In a specific embodiment said steel wires have a carbon content ranging from 0.45 per cent by weight to 0.57 per cent by weight. This specific carbon content range will still allow to make chain link fences.

In a preferred embodiment the steel wires have a wire diameter smaller than 3.0 mm.

The aquaculture net according to the invention preferably has the shape of a square or rectangular box, but may also be shaped as a cone, as a sphere, or any other shape. In one embodiment said aquaculture net has dimensions which are greater than 1 m×1 m×1 m (length×width×depth).

The higher tensile strength may be achieved by the process of cold drawing. As such, in a preferred embodiment, the aquaculture net according to the invention comprises steel wires cold drawn in a final stage. These steel wires preferably have a metallic coating selected from the group consisting of zinc, zinc aluminum alloy, zinc aluminum magnesium alloy and copper alloy.

A chain-link fence having a high carbon content according to the invention may also be used in the mining industry where it is a purpose to lower the weight of the chain-link to facilitate manipulation and installation in e.g. mine tunnels, and to increase the strength and breaking load of the mesh.

BRIEF DESCRIPTION OF FIGURES IN THE DRAWINGS

FIGS. 1 and 2 each show an upper view of an installed aquaculture net (floating support).

MODE(S) FOR CARRYING OUT THE INVENTION

The net can be made of a chain-link fence of steel wires, e.g. plain carbon steel wires where the steel wires are provided with a corrosion-resistant coating and/or an antifouling coating.

Figure 1:
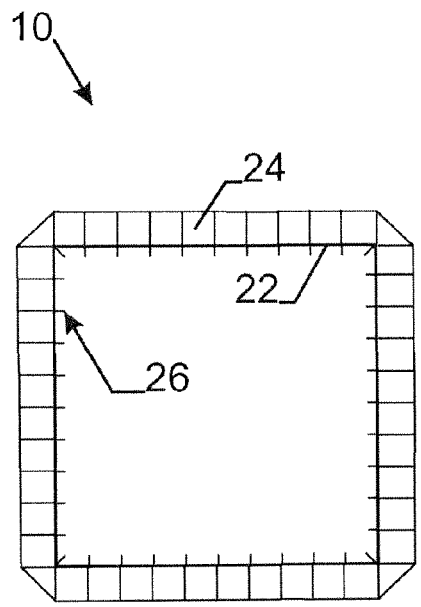

FIG. 1 illustrates a square embodiment of a raft 10 for an aquaculture net as described by the present invention. The raft comprises galvanized steel bars 22 supported by HDPE floating devices 26. A platform 24 is connected thereto. People can walk around on the platform 24. The net can be directly connected to the steel bars 22 by means of ropes or wires.

Figure 2:
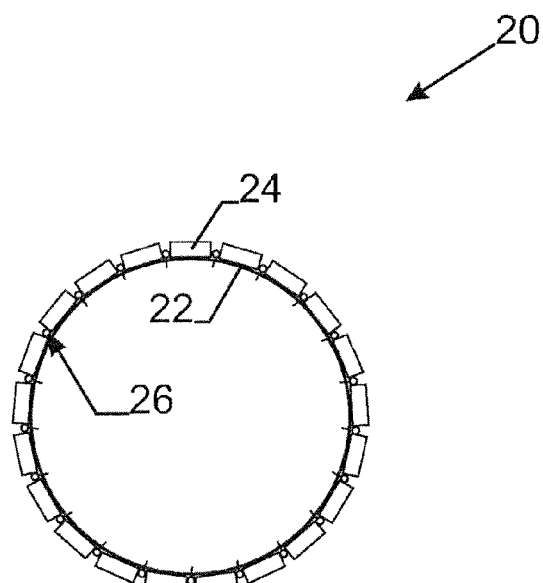

FIG. 2 illustrates a circular embodiment of a raft 20 for an aquaculture net as described by the present invention. Circular rafts 20 are made from several HDPE tubes joined together by means of brackets. The net can be directly connected to the raft by means of ropes or wires. The bottom of the aquaculture net may still have the shape of a rectangle or square whereby the upper side takes a form close to a circle.

Figure 3:
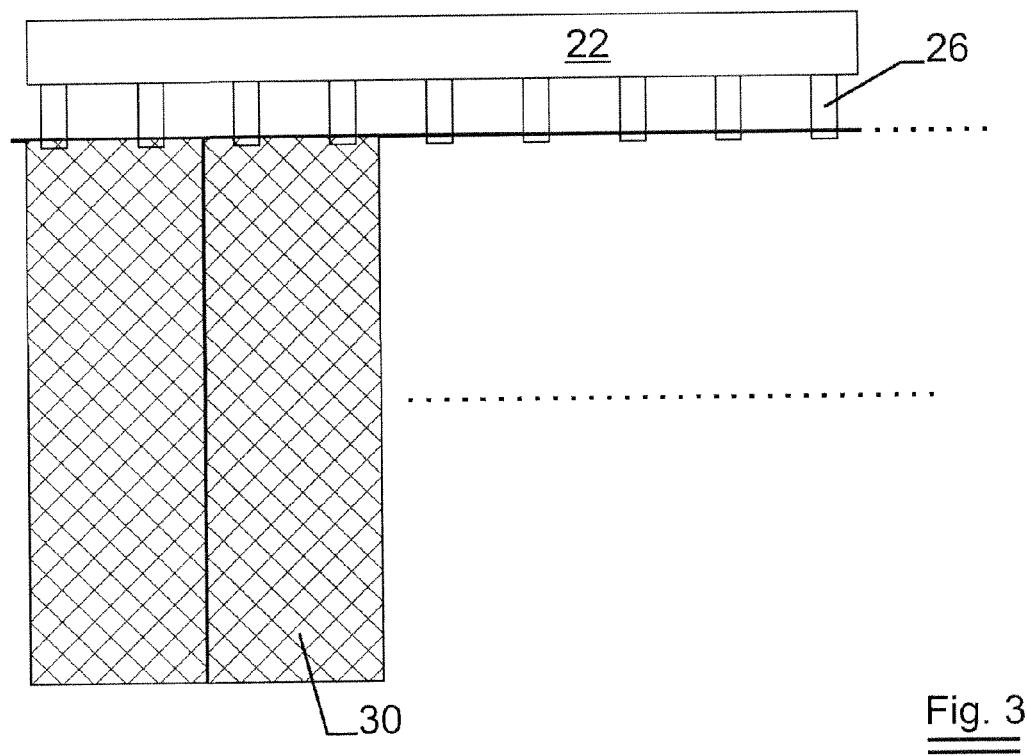
FIG. 3 shows a side view of an installed aquaculture net according to the invention.

FIG. 3 illustrates a side view of an embodiment of an installed aquaculture net 30 according to the present invention. The floating support is of the square type as illustrated in FIG. 1. The aquaculture net 30 is directly connected to the raft by means of various ropes or wires.

Figure 4:
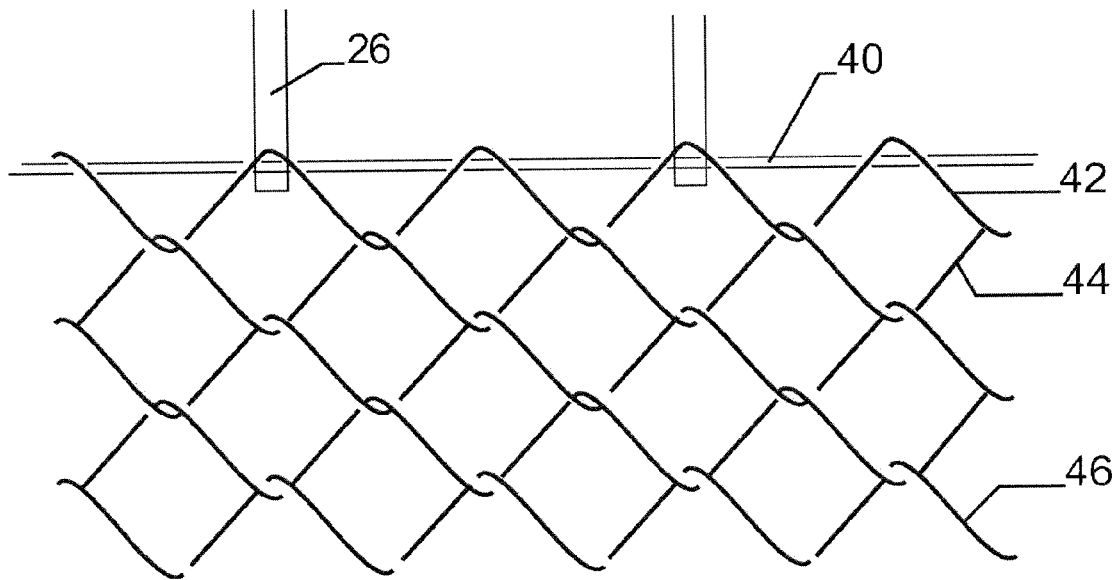
FIG. 4 shows a side view of a chain-link fence aquaculture net according to the invention.

FIG. 4 shows a side view of the top of a chain-link fence aquaculture net 40 according to the present invention. The aquaculture net is connected to the floating raft by means ropes and wires (not shown) for upholding the wires (42, 44, 46) of the chain-link fence. As mentioned above investigation of the failing aquaculture nets revealed that particularly the upper steel wires (42, 44, 46 . . . ) in the aquaculture net were broken.

In a first alternative embodiment the first top wire 42 of the chain-link fence may therefore have a higher tensile strength $R_m$ than the other wires, to be able to carry most weight and to strengthen the attachment to the floating raft. The wires 44 and below may have a lower tensile strength, yet according to the invention.

Other alternatives may be envisaged. The aquaculture net may be divided into several horizontal parts. The upper part may contain the steel wires with the highest tensile strength, the middle part or parts may contain steel wires with an intermediate tensile strength lower than highest tensile strength and the lower part may contain steel wires with the lowest tensile strength. The aquaculture net may also comprise steel wires the tensile strength of which decreases with the position in the net: the lower the position the lower the tensile strength.

In case of a chain link fence, the various horizontal parts of the aquaculture net may be connected to one another by means of a helical wire, by means of a rope or by means of binding wire. In an alternative embodiment, however, the various horizontal parts are not necessarily separate parts but form a continuous chain link fence.

Figure 5:
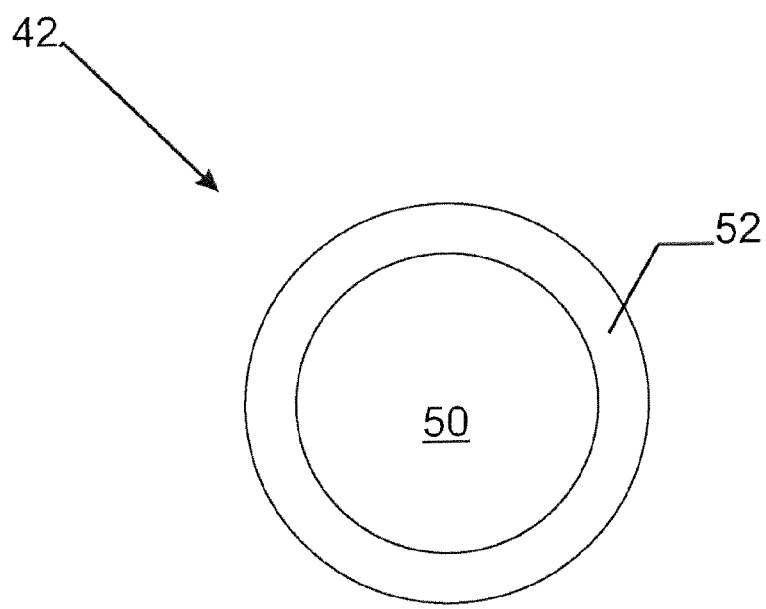
FIG. 5 shows a cross section of a wire according to the invention.

FIG. 5 shows a cross section of a steel wire 42 used in an aquaculture net according to the invention. The steel wire 42 has a steel core 50 and an outer layer of a corrosion resistant anti-fouling coating layer 52 such as a zinc alloy or a copper alloy. A copper nickel alloy as coating is a preferable copper alloy: the copper takes care of the anti-fouling function and the nickel of the anti-corrosion function.

The invention claimed is:

1. A three dimensional aquaculture net being divided into several horizontal parts comprising at least an upper part and a lower part, comprising:
    a chain-link fence, wherein walls of the chain-link fence have only horizontal wavy wires,
    wherein upper wires of the chain-link fence carry weight of a rest of the net when the fence is hung or suspended by the upper wires with the rest of the net hanging downwardly from the upper wires,
    wherein at least the upper part of said three dimensional aquaculture net comprises steel wires having a tensile strength greater than 1500 MPa,
    wherein the lower part comprises steel wires different from the steel wires in the upper part, and
    wherein the steel wires of the upper part have a higher tensile strength than a tensile strength of the steel wires in the lower part.

2. The aquaculture net according to claim 1, wherein said steel wires have a carbon content greater than 0.40 weight percent.

3. The aquaculture net according to claim 2, wherein said steel wires have a carbon content ranging from 0.45 percent by weight to 0.57 percent by weight.

4. The aquaculture net according to claim 1, wherein said steel wires have a wire diameter smaller than 3.0 mm.

5. The aquaculture net according to claim 1, wherein said aquaculture net has length-by-width-by-depth dimensions which are greater than 1 m×1 m×1 m.

6. The aquaculture net according to claim 1, wherein said steel wires are cold drawn in a final stage.

7. The aquaculture net according to claim 6, wherein said steel wires have a metallic coating selected from the group consisting of zinc, zinc aluminum alloy, zinc aluminum magnesium alloy and copper alloy.

8. The aquaculture net according to claim 1, wherein said steel wires have a tensile strength greater than 1900 MPa.

9. The aquaculture net according to claim 1, wherein said steel wires have a tensile strength greater than 2500 MPa.

10. The aquaculture net according to claim 1, wherein the chain-link fence is woven from single steel wires.

11. The aquaculture net according to claim 1, wherein the several horizontal parts comprises a middle part disposed between the upper part and the lower part, and wherein the middle part contains steel wires with a tensile strength lower than the tensile strength of the steel wires contained in the upper part, and higher than the tensile strength of the steel wires contained in the lower part.

12. The aquaculture net according to claim 1, wherein the chain-link fence defines an interior space having length-by-width-by-depth dimensions that is bordered by the chain-link fence.

13. The aquaculture net according to claim 12, wherein said steel wires have at least one of a carbon content greater than 0.40 weight percent and a wire diameter smaller than 3.0 mm.

14. The aquaculture net according to claim 12, wherein said aquaculture net has length-by-width-by-depth dimensions which are greater than 1 m×1 m×1 m.

15. The aquaculture net according to claim 12, wherein said steel wires have a metallic coating selected from the group consisting of zinc, zinc aluminum alloy, zinc aluminum magnesium alloy and copper alloy.

16. The aquaculture net according to claim 12, wherein said steel wires have a tensile strength greater than 1900 MPa.

* * * * *